G. LAKE.
HEAT DISTRIBUTER AND ACCUMULATOR FOR COOKING VESSELS.
APPLICATION FILED APR. 21, 1911.
1,008,603.
Patented Nov. 14, 1911.
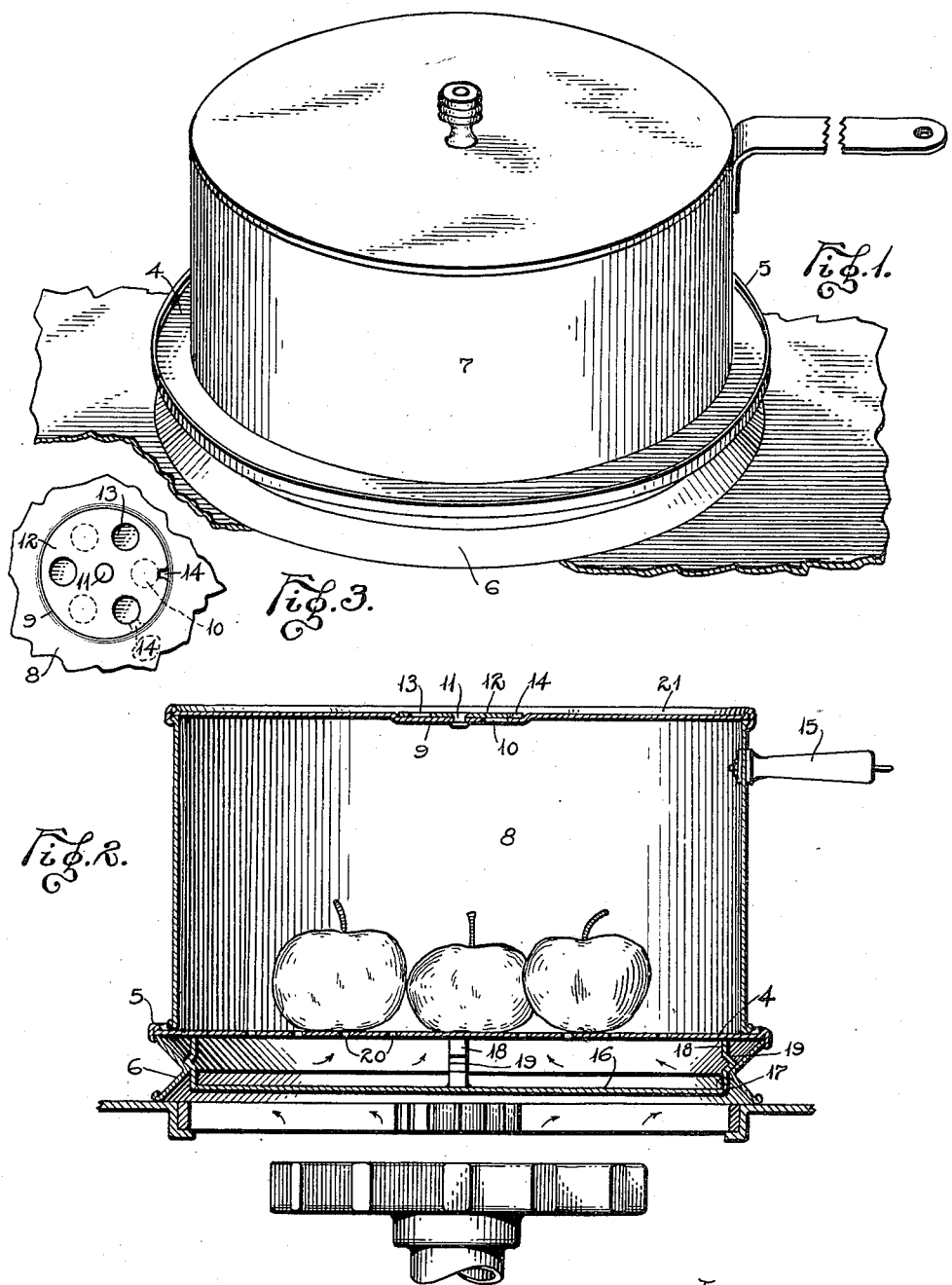

UNITED STATES PATENT OFFICE.

GOLLADAY LAKE, OF CLEVELAND, OHIO.

HEAT DISTRIBUTER AND ACCUMULATOR FOR COOKING VESSELS.

1,008,603. Specification of Letters Patent. Patented Nov. 14, 1911.

Application filed April 21, 1911. Serial No. 622,550.

*To all whom it may concern:*

Be it known that I, GOLLADAY LAKE, a citizen of the United States, residing at Cleveland, in the county of Cuyahoga and State of Ohio, have invented certain new and useful Improvements in Heat Distributers and Accumulators for Cooking Vessels, of which the following is a specification.

This invention relates to heat accumulating and distributing devices to be used with utensils in cooking, or for other purposes, and has for its object to provide a heat accumulator and distributer which is simple in construction, inexpensive to manufacture, and efficient in use. This device is also arranged to coöperate with a hood to form a baking chamber, the hood setting on same to inclose the top thereof.

The invention is embodied in novel construction and arrangement of parts, which are illustrated in the accompanying drawings, in which similar reference characters indicate similar parts, and in which—

Figure 1 is a perspective of the accumulator and distributer as in use; Fig. 2 is a vertical section of same and the hood as in use; and Fig. 3 is a detail in plan view of the damper mechanism.

Referring specifically to the drawings, the heat distributer and accumulator is shown as comprising an upper plate 4, of circular or other outline, having a plurality of apertures 20 therein, and the edge of the said plate being raised to form an annular rib 5; an annular wall 6 of V-shaped cross section set on edge with the point thereof extending inwardly, the upper edge of which is secured to the edge of the plate 4; and a lower plate 16, of circular or other outline to conform with the upper plate and of reduced dimensions, which has several integral and upstanding fingers 18 spaced around the periphery thereof, the said fingers having outbent portions 19 adapted to snap over the inner ridge formed by the V-shaped wall 6 to retain the lower plate in position. This lower plate is arranged below the said ridge and is spaced above the bottom of the wall 6, thus forming an air space below the said plate which is connected to the air space or chamber between the two plates by the annular passage 17 between the said lower plate 16 and the wall 6. The fingers 18 are arranged to butt against the upper plate and prevent inward movement of the lower plate. This lower plate 16 can be removed by disengaging the fingers 18 from the wall 6.

The hood is shown at 8 as comprising a cylindrical casing with its lower end open and having the upper flattened or level top with an annular rib 21 around the periphery thereof. At the side and near the top of the said hood is disposed a handle 15, and at the center of the top of the said hood is pivoted by means of the pin 11 a damper plate 12. This damper plate 12 has several openings 13 which are adapted to register with the openings 10 in the top by turning the said damper plate. This damper plate 12 is made flush with the top of the hood by setting it in a depression 9 in the top thereof. The damper can be conveniently turned to open or close same by means of the notch 14 in the edge thereof.

The heat distributer when in use is placed over the flame or other source of heat, and the heat striking the center of the lower plate is arrested from direct upward travel and is carried around the periphery of the said plate to the air space between the two plates, wherein the heat has become distributed evenly and is accumulated. In this manner the upper plate is uniformly heated, the central portion having the tendency to become the most highly heated is kept at about the same temperature as the outer portions by means of the heat being carried outwardly by the lower plate. Therefore, by placing any cooking vessel or the like 7 on the upper plate the same will receive a uniform heat on its lower surface, thus preventing the contents from burning or becoming unevenly heated. The heat in accumulating in the air space also raises the efficiency of same. The rib 5 retains the vessel or other object placed on the said plate in position thereon. This device can also be inverted over the flame. When so used, the greater part of the heat escapes out the passage 17 and as a result the heat is modified.

The hood can be placed on the upper plate to form a baking chamber within same, which becomes uniformly heated. This can be used to advantage in many instances which will be apparent to the user. If desired the damper can be opened or closed at will to regulate the heat within the hood, and it will also be seen that vessels or the like can be placed on the top of the hood to receive the rising heat. The rib 21 on the hood, similar to rib 5 of the distributer and accumulator, prevents the objects on the hood from sliding off.

This device can be used for many different uses and it is not thought necessary to go into great detail as to the various applications thereof, this being apparent to the users.

The invention is also capable of being altered within the scope of the appended claim, and it is not desired to limit same to the specific form as shown in the drawings and as described herein.

Having described my invention, what I claim as new is:

In a device of the character described, an upper plate having a plurality of apertures therein, a V-shaped wall set on edge with the ridge thereof inward and secured to the bottom of the said upper plate, and a lower plate having fingers arranged to engage the ridge of the said wall.

In testimony whereof I do affix my signature in presence of two witnesses.

GOLLADAY LAKE.

Witnesses:
MONROE E. MILLER,
EUGENE E. WOLF.

---

Copies of this patent may be obtained for five cents each, by addressing the "Commissioner of Patents, Washington, D. C."